US008340733B2

(12) United States Patent
Heikkinen et al.

(10) Patent No.: US 8,340,733 B2
(45) Date of Patent: Dec. 25, 2012

(54) ELECTRONIC DEVICE HAVING SELECTIVE TOUCH SENSITIVE DISPLAY WINDOW

(75) Inventors: Marko Kullervo Heikkinen, Tampere (FI); Joni Kristian Arola, Tampere (FI)

(73) Assignee: Nokia Corporation, Espoo (FI)

( * ) Notice: Subject to any disclaimer, the term of this patent is extended or adjusted under 35 U.S.C. 154(b) by 1107 days.

(21) Appl. No.: 11/986,801

(22) Filed: Nov. 26, 2007

(65) Prior Publication Data

US 2009/0137280 A1 May 28, 2009

(51) Int. Cl.
H04M 1/00 (2006.01)
H04M 5/00 (2006.01)
G06F 3/041 (2006.01)

(52) U.S. Cl. .................. 455/575.4; 455/575.1; 345/173; 379/330

(58) Field of Classification Search ............... 455/575.1, 455/575.4; 345/173; 379/330
See application file for complete search history.

(56) References Cited

U.S. PATENT DOCUMENTS

| | | | |
|---|---|---|---|
| 5,450,619 A | 9/1995 | Maeda | 455/89 |
| 5,528,235 A * | 6/1996 | Lin et al. | 341/22 |
| 6,415,138 B2 * | 7/2002 | Sirola et al. | 455/90.1 |
| 7,187,363 B2 * | 3/2007 | Nguyen et al. | 345/168 |
| 7,197,345 B2 * | 3/2007 | Kim et al. | 455/575.3 |
| 7,245,949 B2 * | 7/2007 | Kim et al. | 455/575.4 |
| 7,620,174 B1 * | 11/2009 | Bick | 379/433.01 |
| 2005/0009556 A1 * | 1/2005 | Hickey et al. | 455/550.1 |
| 2005/0201550 A1 * | 9/2005 | Yang et al. | 379/433.02 |
| 2006/0044290 A1 * | 3/2006 | Hurwitz et al. | 345/204 |
| 2007/0217132 A1 * | 9/2007 | Collins | 361/681 |

FOREIGN PATENT DOCUMENTS

| | | |
|---|---|---|
| GB | 2328128 A | 2/1999 |
| JP | 2002-055737 | 2/2002 |
| WO | WO 02/35333 A1 | 5/2002 |

* cited by examiner

Primary Examiner — Meless N Zewdu
Assistant Examiner — Edd Rianne Plata
(74) Attorney, Agent, or Firm — Harrington & Smith

(57) ABSTRACT

An apparatus including a first housing section and a second housing section. The first housing section includes a window having a touch sensitive member which is at least partially see-through. The second housing section is movably connected to the first housing section. The second housing section includes a display. When the second housing section is at a first position relative to the first housing section, a first portion of the display is located at a first location directly behind the window. When the second housing section is at a second position relative to the first housing section, the first portion is located at a second different location, spaced from the first location directly behind the window, and a second portion of the display is located at the first location directly behind the window.

29 Claims, 4 Drawing Sheets

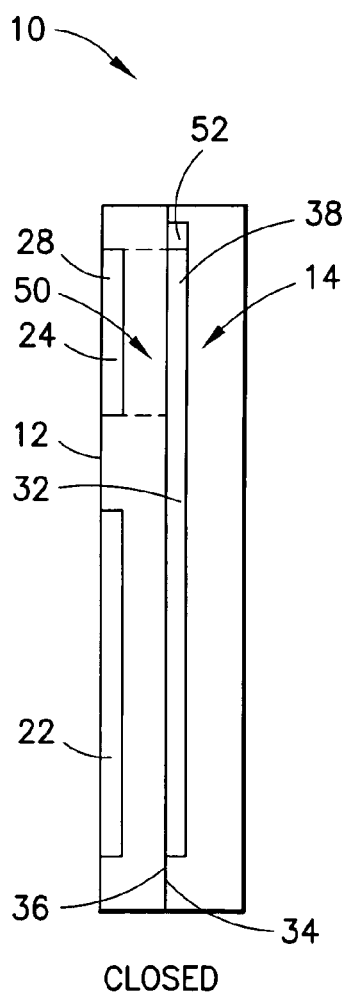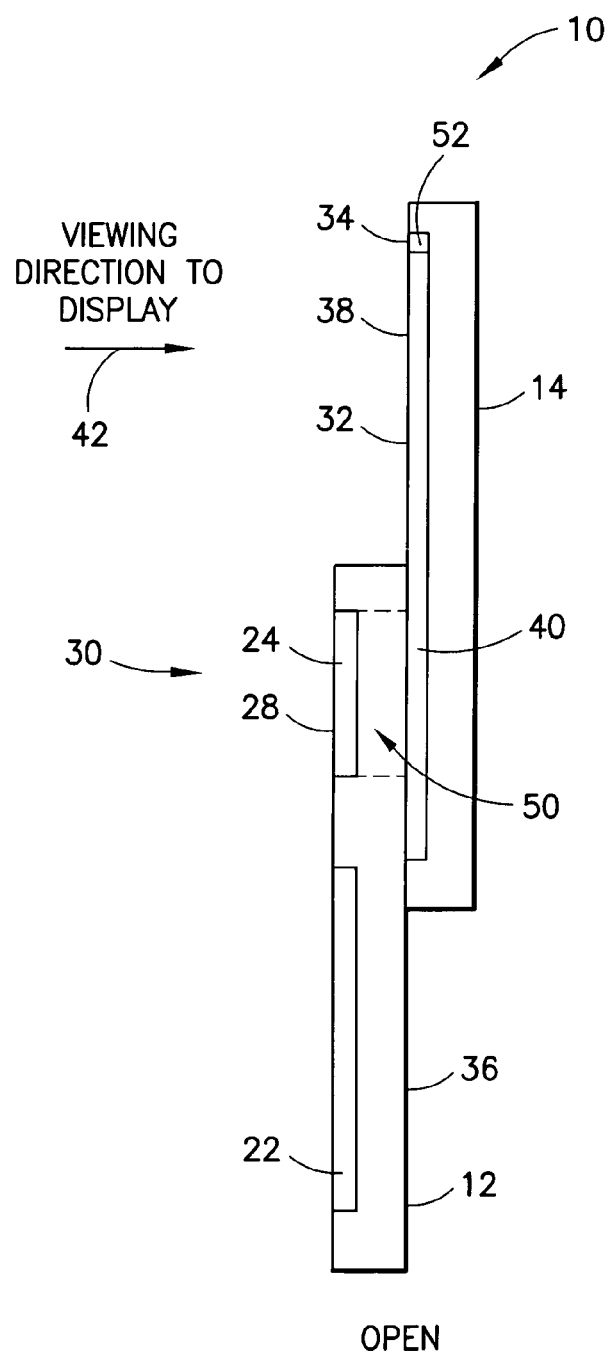

ELECTRONIC DEVICE HAVING SELECTIVE TOUCH SENSITIVE DISPLAY WINDOW

BACKGROUND OF THE INVENTION

1. Field of the Invention

The invention relates to an electronic device and, more particularly, to an electronic device having a display window which can be selectively touch sensitive.

2. Brief Description of Prior Developments

U.S. Pat. No. 5,450,619 discloses a slide telephone where an upper portion of a display is covered and uncovered as the telephone is reconfigured. Telephones are also known which have touch screen displays, such as the Apple® IPHONE. A touch screen display can function both as a display screen and also as a user input.

For telephones which do not have a touch screen display, distinct function keys, such as in a keypad, are provided separate from a normal display screen, such as an LCD display. However, distinct function keys are normally stable and cannot be changed according to an application running or displayed on the handset display.

There is a desire to provide a user interface for an apparatus which does not have a touch screen display, but which can still change function key features of a user input according to an application running or displayed on the handset display. There is also a desire to protect a display while the apparatus is not in use, but which allows at least a portion of the display to be viewable by a user while the display is protected.

SUMMARY OF THE INVENTION

In accordance with one aspect of the invention, an apparatus is provided including a first housing section and a second housing section. The first housing section includes a window having a touch sensitive member which is at least partially see-through. The second housing section is movably connected to the first housing section. The second housing section includes a display. When the second housing section is at a first position relative to the first housing section, a first portion of the display is located at a first location directly behind the window. When the second housing section is at a second position relative to the first housing section, the first portion is located at a second different location, spaced from the first location directly behind the window, and a second portion of the display is located at the first location directly behind the window.

In accordance with another aspect of the invention, an apparatus is provided comprising a first housing section, a second housing section and a controller. The first housing section comprises a window comprising a touch sensitive member which is at least partially see-through. The second housing section is movably connected to the first housing section. The second housing section comprises a display. The controller is in the first and/or second housing section. The controller is connected to the touch sensitive member. The controller is adapted to allow the touch sensitive member to function as a user input for the apparatus when the second housing section is at a second position relative to the first housing section. The controller is adapted to prevent the touch sensitive member from being used as the user input when the second housing section is at a first position relative to the first housing section. The first position comprises a first portion of the touch sensitive member being located directly behind the window. The second position comprises the first portion of the touch sensitive member being located spaced from being directly behind the window.

In accordance with another aspect of the invention, a method is provided comprising providing a first housing section comprising a window comprising a touch sensitive member which is at least partially transparent; providing a second housing section including a display; and movably connecting the second housing section to the first housing section. The second housing section is movable relative to the first housing section between a first position and a second position. In the first position a first portion of the display is located at a first location directly behind the window. In the second position the first portion of the display is located at a second location, spaced from the first location directly behind the window and beyond an outer edge of the first housing section, and a second portion of the display is located at the first location directly behind the window.

In accordance with another aspect of the invention, a method is provided comprising moving a second housing section of a hand-held electronic apparatus relative to a first housing section of the apparatus from a first position to a second position, wherein in the first position a first portion of a display on the second housing section is located at a first location directly behind a window on the first housing section, and wherein in the second position the first portion is located spaced from the first location directly behind the window; and changing functionality of the window from a protective only see-through window when the second housing section is in the first position to both a touch sensitive user input and a protective see-through window when the second housing section is in the second position.

In accordance with another aspect of the invention, a program storage device is provided which is readable by a machine, tangibly embodying a program of instructions executable by the machine for performing operations to control a user input in an electronic device, wherein the user input comprises a touch sensitive member which is at least partially see-through, the operations comprising determining whether a second housing section of the electronic device is located at a first position or a second position relative to a first housing section of the device, wherein the touch sensitive member is located on the first housing member and a display is located on the second housing member, wherein different portions of the display are visible through the window when the first and second housing sections are at the first and second positions, respectively; allowing input into the electronic device by a user at the touch sensitive member when the first and second housing sections are at the second position; and preventing input into the electronic device at the touch sensitive member when the first and second housing sections are at the first position.

BRIEF DESCRIPTION OF THE DRAWINGS

The foregoing aspects and other features of the invention are explained in the following description; taken in connection with the accompanying drawings, wherein:

FIG. 2 is a diagrammatic side view of the apparatus shown in FIG. 1;

FIG. 5 is a diagrammatic side view of the apparatus shown in FIG. 4;

DETAILED DESCRIPTION OF THE PREFERRED EMBODIMENT

Figure 1:
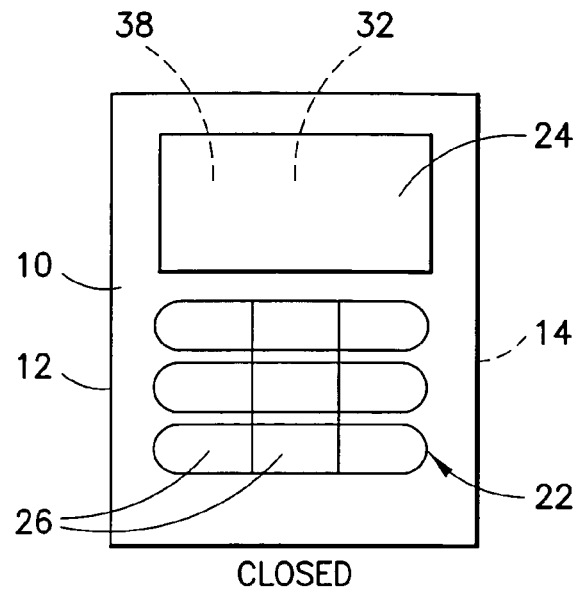
FIG. 1 is a front elevational view of an apparatus comprising features of the invention shown in a closed position.

Referring to FIG. 1, there is shown a front elevational view of an apparatus 10 incorporating features of the invention. Although the invention will be described with reference to the exemplary embodiment shown in the drawings, it should be understood that the invention can be embodied in many alternate forms of embodiments. In addition, any suitable size, shape or type of elements or materials could be used.

The apparatus 10, in this embodiment, is a portable hand-held electronic device. In a preferred embodiment the apparatus is a mobile telephone. However, features of the invention could be used in any suitable type of apparatus, such as a PDA, a music player, or a gaming device. In addition, as is known in the art, a hand-held electronic device can comprise multiple applications, such as a mobile telephone application, a music player application, an Internet browser application, a game playing application, a digital camera or digital video recorder, etc.

Figure 4:
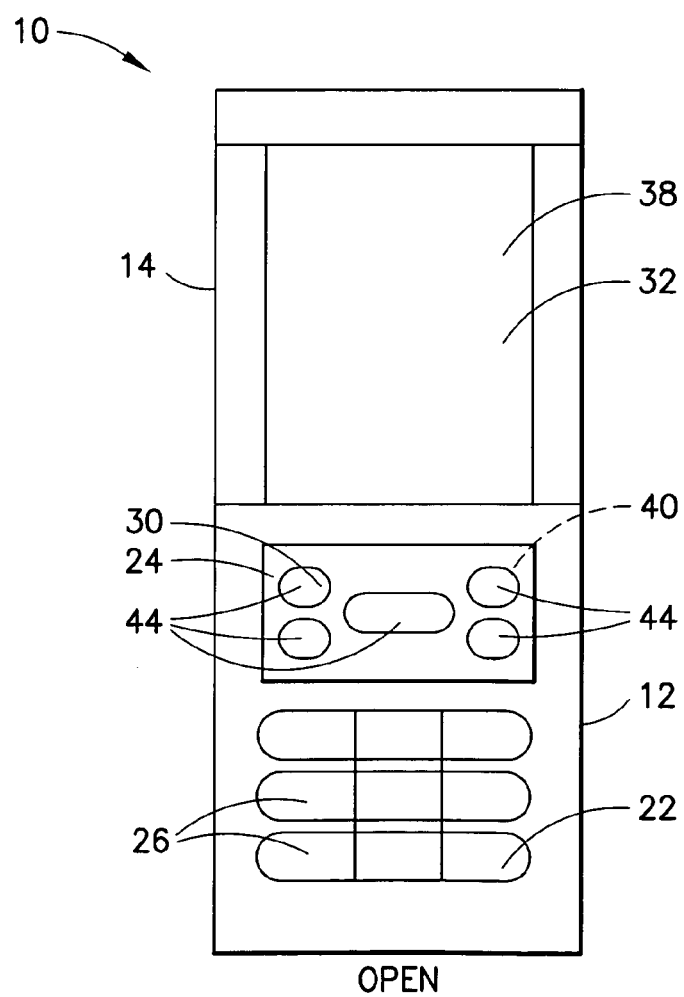
FIG. 4 is a front elevational view of the apparatus shown in FIG. 1 in an open position.
Figure 3:
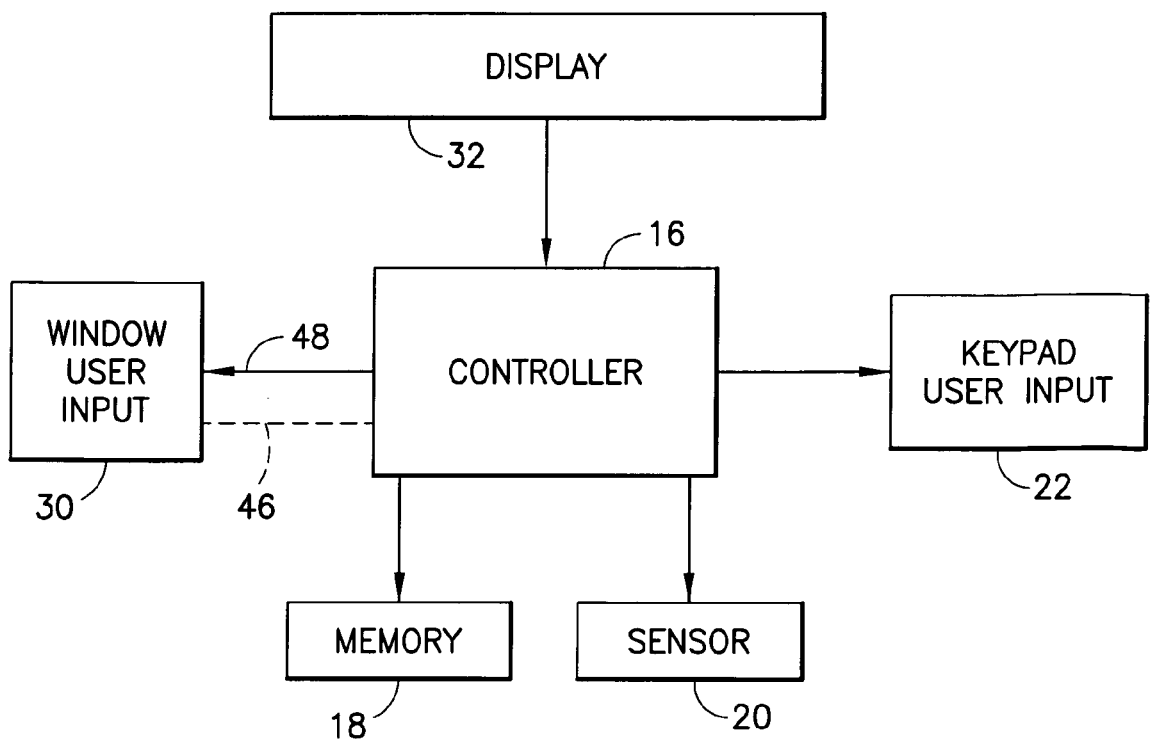
FIG. 3 is diagram illustrating some of the components of the apparatus shown in FIG. 1.

Referring also to FIGS. 2-3, the apparatus 10 comprises a first housing section 12 and a second housing section 14. The first and second housing sections 12, 14 are movable relative to each other between a first closed position (FIGS. 1 and 2) and a second open position (FIGS. 4 and 5). The first and second housing sections 12, 14 form a housing for electrical/electronic components including a controller 16, a memory 18 and a sensor 20. The controller can comprise a microprocessor for example. The sensor 20 is adapted to sense at least one position of the first and second housing sections relative to each other. However, in an alternate embodiment the sensor might not be provided, such as if the apparatus has another means to sense the first and second housing sections being at either the first or second positions. The memory 18 and the controller 16 are programmed or otherwise adapted to run one or more applications on the apparatus 10, such as the applications noted above for example.

In this embodiment, the second housing section 14 is longitudinally slidable relative to the first housing section 12 in a straight path. Thus, in this embodiment the apparatus 10 is a slide phone. However, features of the invention could be used with an apparatus having housing sections movable other than in a straight longitudinal path, such as a pivotal path or other non-translation path for example.

The first housing section 12 comprises a first user input section 22 and a window 24. In this embodiment the first user input section 22 comprises a keypad having user depressible keys 26. In the mobile telephone embodiment shown, the keys 26 are alphanumeric keys customary for a mobile telephone. However, in alternate embodiments any suitable type of keys or keypad could be provided. In one type of alternative embodiment, the first user input section 22 might not be provided.

The window 24 comprises a touch sensitive member 28. The touch sensitive member 28 is at least partially see-through, such as transparent for example. In one type of embodiment the touch sensitive member 28 comprises a substantially transparent touch sensitive film. The film could be provided on a transparent substrate for example. The touch sensitive member 28 forms a second user input 30 connected to the controller 16 as indicated in FIG. 3. The touch sensitive member 28 is configured to allow a user to touch a front exterior surface of the touch sensitive member 28 with his/her finger or a stylus. The touch sensitive member 28 can then send a signal to the controller 16 indicating what location of the front surface was touched.

The second housing section 14 comprises a display 32 which is connected to the controller 16. The display 32 is preferably not a touch screen display. Instead, the display 32 is preferably merely a conventional non-touch screen display, such as a conventional LCD display for example. The display 32 is located on a first side 34 of the second housing section 14.

In the closed position shown in FIG. 2, the first side 34 of the second housing section 14 is located opposite the rear side 36 of the first housing section 12. In a preferred embodiment, when the first and second housing sections 12, 14 are in the closed first position the first side 34 is substantially completely covered by the first housing section 12. However, in alternate embodiments the first side 34 might not be substantially completely covered by the first housing section 12 in the closed position of the apparatus. In the closed position, the front of the display 32 is covered by the first housing section 12. However, because of the window 24, a first portion 38 of the display 32 located at a first location directly behind the window 24 is viewable through the window 24 in this closed position. This allows the user to view information on the display's first portion 38 while the apparatus is closed. For the telephone example shown, this could be information regarding battery strength, signal strength, identification of an incoming call, etc. for example.

As noted above, the window 24 includes a touch sensitive member 28. In a preferred embodiment the touch sensitive member 28 is operationally inoperative when the apparatus 10 is in the closed position. This could be accomplished by any suitable means, such as no electricity flowing to or from the touch sensitive member 28, or the controller 16 being programmed or having software for merely ignoring any signals from the touch sensitive member 28 when the apparatus is in the closed position for example. In an alternate embodiment the touch sensitive member 28 is operationally operative when the apparatus 10 is in the closed position.

Referring also to FIGS. 4 and 5, the apparatus 10 is shown in an open or extended second position. As can be seen, the second housing section 14 has slid upward relative to the first housing section 12. The movement from the closed position to the open position could be manual, automatic (such as spring biased), or semi-automatic (such as initially manual for part of the travel distance and then spring biased for the rest of the travel distance). In the open position shown in FIGS. 4 and 5, the first portion 38 of the display 32 is now at a second location above the top side of the first housing section 12 and spaced from the location behind the window 24. In this second location the first portion 38 of the display 32 is no longer covered by the first housing section 12. The first portion 38 of the display 32 is exposed and located at the front side of the apparatus 10. However, a second lower portion 40 of the display 32 is now located at the first location directly behind the window 24. Thus, in the second open position of the apparatus 10, the second portion 40 of the display 32 can be viewed from direction 42 at the front of the apparatus 10 through the window 24.

In a preferred embodiment, the controller 16 is programmed or the apparatus 10 has software to display at least one predetermined image on the second portion 40 of the display 32 when the apparatus is at the open position. For the example shown in FIG. 4, the image displayed on the second portion 40 (and viewable through the window 24) comprises application function icons 44. However, in alternate embodiments any suitable image(s) could be displayed. For example, the images 44 might not comprise icons, and could include text and/or pictures.

In a preferred embodiment, the image displayed at the second portion 40 is dependent upon the application operating on the apparatus. For example, if the application is a music player application, the image might comprise images of music player functions, such as icons for Play, Stop, Pause, Fast Forward, Reverse, Menu, etc. As another example, if the application is a telephone application, the image might comprise images of telephone handset functions, such as Mute, Speaker, Hold, Speed Dial, Calendar, Menu, etc. These are only some examples and should not be considered as limiting the scope of the invention. These image(s) at the second portion 40 can be viewed through the window 24.

The apparatus 10 is preferably programmed or has software to activate (or otherwise allow functional use of) the touch sensitive member 28 when the apparatus 10 is in its open position or when the second housing section 14 is moved away from its closed position. In the open position, a user can select one of the images 44 by pressing on the outer surface of the touch sensitive member 28 with his/her finger or a stylus (directly in front of the selected images 44) to input a signal to the controller 16 corresponding to that selected image. A signal can be sent on signal line 48 (see FIG. 3) from the window 24 (the second user input 30 having the touch sensitive member 28). Thus, the display 32 does not need to be a touch screen display. The display 32 can be a conventional non-touch screen display, such as a conventional LCD display. However, the window 24, with its touch sensitive member 28, can be used in conjunction with the second portion 40 of the display 32 to form a functional equivalent to a touch screen display. In one type of embodiment the touch sensitive function of the window 24 could be turned OFF for one or more applications or for one or more portions of an application.

With the invention, an apparatus having a pop-up slide configuration can be provided with a changeable touch key functionality. The touch key functionality can be provided on a housing section which does not have a display, wherein the functionality can use a main display image from a different housing. The invention can use a touch window that uses the image from a display that is on a different movable housing than the touch window. As noted above, in the prior art distinct function keys are normally stable and cannot be changed according to the application displayed to handset display (similar to keys 26). With the invention, one display can be used to show the normal image of the handset, such as first portion 38 of the display 32 when in the up, extended position shown in FIGS. 4 and 5. The same display can be used to also display the image to present functions of the touch function keys formed by the combination of touch sensitive member 28 and the image(s) 44. However, the display 32 does not need to be a touch screen display. Touch key images (such as image(s) 44) can be displayed through a window using same display 32 where the main image is shown (such as at 38 in the open position).

The invention is preferably used with a pop-up slide apparatus with a large enough display to allow different portions of the display to be viewable through the window when the slide configuration is in its open position and in its closed position. The display merely presents images and is not a touch sensitive member. A separate touch sensitive film provides the touch function. The window supports the touch sensitive film at an opening to viewing a portion of the display such that the window can allow viewing of images from the main display while the apparatus is in its closed configuration. There is no need for a separate touch screen display to present touch functions and changeable function keys.

When closed, an image of the main display is displayed through the window. The touch sensitive function at the window is preferably not in use in the closed position. When opened, an image on the main display is seen through the window to display key functions as well as an image spaced from the window. The key functions, provided at the combination of the window 24 and the second portion 40 of the display, are actuated by touching the touch sensitive film on the window in front of the key functions shown on the display. Key functions can be changed according to the application. No extra display is needed for touch keys (such as a touch screen display). However, in an alternate embodiment a touch screen display could be provided. The touch window is on different housing than the display to present touch functions. The main display is protected behind the front housing section of the apparatus when in the closed position, and at least partially protected and covered when in the open position.

In one type of alternate embodiment, the apparatus can comprise a system for selectively causing the window to become opaque for one or more applications or for a portion of an application, such as when an electrical current is passed through the window. This is illustrated by control connection line 46 shown in FIG. 3. This could be used for privacy or security. In another type of alternate embodiment, the window can comprise a system for selectively causing the window to become partially opaque or polarized for viewing only a limited amount of the information on the display through the window and/or viewing the information only at a limited angle of viewing.

In this embodiment the first housing section 12 has an open space 50 behind the window 24. This open space can be used as an acoustic chamber for a speaker or sound transducer 52 of the apparatus. However, in an alternate embodiment, the acoustic sound chamber 50 might not be provided. In another alternate embodiment, the chamber 50 could be used to help illuminate the display 32 at the first location.

Figure 6:
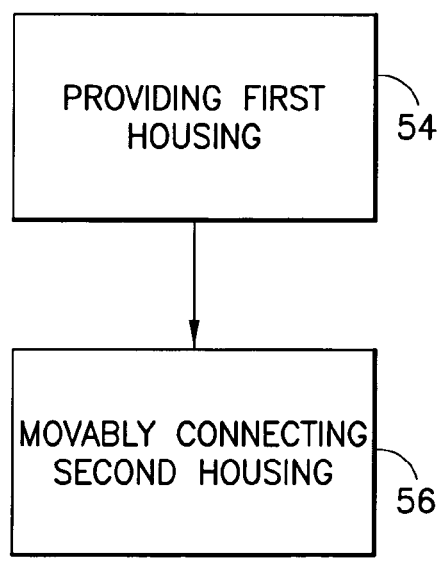
FIG. 6 is a block diagram illustrating steps of one method of the invention.

Referring also to FIG. 6, one method of manufacturing an apparatus comprising features of the invention can comprise providing a first housing section as indicated by block 54 comprising a window having a touch sensitive member which is at least partially transparent; providing a second housing section including a display; and movably connecting the second housing section to the first housing section as indicated by block 56. The second housing section is movable relative to the first housing section between a first position and a second position. In the first position a first portion of the display is located at a first location directly behind the window. In the second position the first portion of the display is located at a second location, spaced from the first location directly behind the window and beyond an outer edge of the first housing section, and a second portion of the display is located at the first location directly behind the window.

The method can further comprise connecting a controller to the touch sensitive member and the display, wherein the controller is adapted to automatically disable the touch sensitive member from being used as a user input for the device when the second housing section is at the first position. The method can further comprise connecting a controller to the touch sensitive member and the display, wherein the controller is adapted to automatically display a predetermined image on the second portion of the display when the second housing section is at the second position. The method can comprise the controller being adapted to automatically disable the touch sensitive member from being used as a user input for the device when the second housing section is at the first position.

Figure 7:
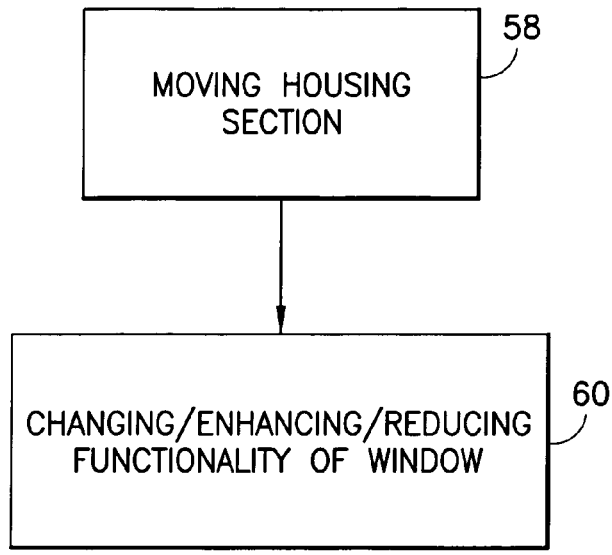
FIG. 7 is a block diagram illustrating steps of another method of the invention.

Referring also to FIG. 7, in accordance with one method of using the invention, the method can comprise moving a second housing section of a hand-held electronic apparatus relative to a first housing section of the apparatus from a first position to a second position as indicated by block 58, wherein in the first position a first portion of a display on the second housing section is located at a first location directly behind a window on the first housing section, and wherein in the second position the first portion is located spaced from the first location directly behind the window; and changing functionality of the window as indicated by block 60 from a protective only see-through window when the second housing section is in the first position to both a touch sensitive user input and a protective see-through window when the second housing section is in the second position.

Figure 8:
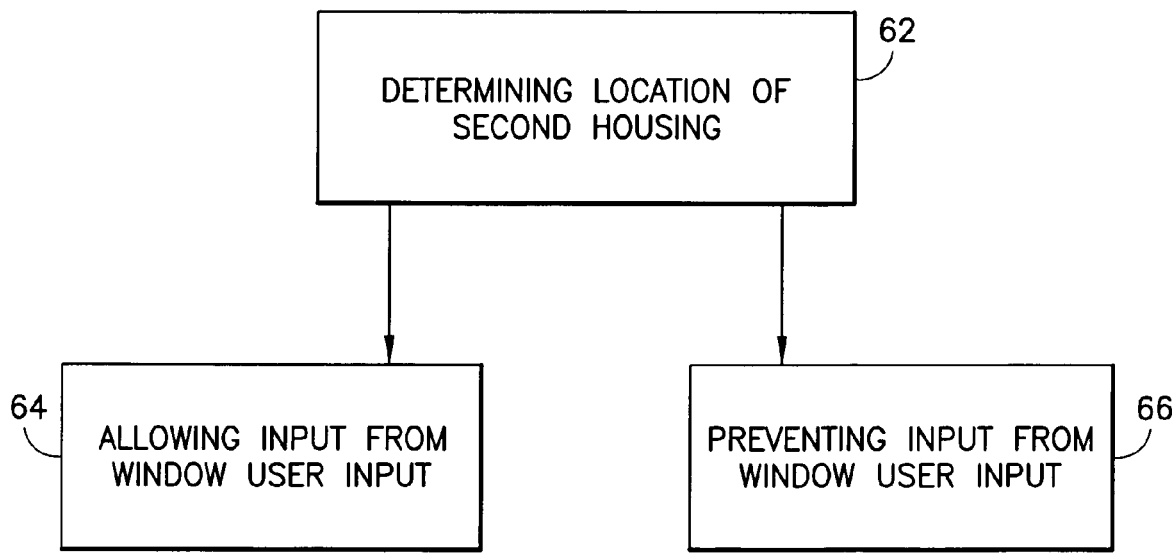
FIG. 8 is a block diagram illustrating operations of software comprising features of the invention.

Referring also to FIG. 8, the invention can comprise software, such as on or in an electronic device or memory or program storage medium, adapted to perform operations including determining as indicated by block 62 whether a second housing section of the electronic device is located at a first position or a second position relative to a first housing section of the device, wherein the touch sensitive member is located on the first housing member and a display is located on the second housing member, wherein different portions of the display are visible through the window when the first and second housing sections are at the first and second positions, respectively; allowing input into the electronic device by a user at the touch sensitive member as indicated by block 64 when the first and second housing sections are at the second position; and preventing input into the electronic device at the touch sensitive member as indicated by block 66 when the first and second housing sections are at the first position.

One of the features of the invention is the ability to selectively allow use of the window 24 as a user input section of the apparatus. This could be based, at least partially, upon a user menu selection in the device and/or based upon application programming for example. However, as noted above, the ability to turn the user input function of the window 24 ON and OFF might not be provided, such as if the user input function of the window is always ON and available for use with any suitably programmed application.

It should be understood that the foregoing description is only illustrative of the invention. Various alternatives and modifications can be devised by those skilled in the art without departing from the invention. For example, features recited in the various dependent claims could be combined with each other in any suitable combination(s). Accordingly, the invention is intended to embrace all such alternatives, modifications and variances which fall within the scope of the appended claims.

What is claimed is:

1. An apparatus comprising:
a first housing section comprising a window, the window comprising a touch sensitive member which is at least partially see-through;
a second housing section movably connected to the first housing section, wherein the second housing section comprises a display,
wherein when the second housing section is at a first position relative to the first housing section, a first portion of the display is located at a first location directly behind the window, and when the second housing section is at a second position relative to the first housing section the first portion is located at a second different location, spaced from the first location directly behind the window, and a second portion of the display is located at the first location directly behind the window, where the first position comprises a closed position and the second position comprises an open position,
where the apparatus further comprises a controller connected to the display and the at least partially see-through touch sensitive member, wherein the controller is adapted to automatically disable the at least partially see-through touch sensitive member from being used as a user input for the device when the second housing section is at the closed position.

2. An apparatus as in claim 1 wherein the first housing section comprises an alphanumeric keypad.

3. An apparatus as in claim 1 wherein the second housing section is longitudinally slidable relative to the first housing section between the first and second positions.

4. An apparatus as in claim 1 wherein the first position comprises the display being completely covered by the first housing section, and the first portion of the display being viewable through the window.

5. An apparatus as in claim 4 wherein the second position comprises the first portion of the display being located above a top side of the first housing section, and the second portion of the display being viewable through the window.

6. An apparatus as in claim 1 wherein the touch sensitive member comprises a touch sensitive film which is transparent.

7. An apparatus as in claim 1 wherein an acoustic chamber is provided between the touch sensitive member and the display.

8. An apparatus as in claim 1 wherein the window is located at a first side of the apparatus, and wherein the first portion of the display is located at the first side of the apparatus when the second housing section is at the second position.

9. An apparatus as in claim 1 wherein the controller is adapted to automatically display a predetermined image on the second portion of the display when the second housing section is at the second position.

10. An apparatus as in claim 9 wherein the image comprises an image of function keys.

11. An apparatus as in claim 9 wherein the image is specific to an application in use on the apparatus, wherein the controller is adapted to display at least one of a plurality of different images on the second portion dependent upon the application in use on the apparatus.

12. An apparatus as in claim 1 where the controller is connected to the window adapted to apply an electrical current to the window to cause the window to become at least partially opaque or reduce an angle of view for viewing information on the display through the window.

13. An apparatus comprising:
a first housing section comprising a window, the window comprising a touch sensitive member which is at least partially see-through;
a second housing section movably connected to the first housing section, wherein the second housing section comprises a display;
and a controller in the first and/or second housing section, wherein the controller is connected to the at least partially see-through touch sensitive member, wherein the controller is adapted to allow the at least partially see-through touch sensitive member to function as a user input for the apparatus when the second housing section is at a second position relative to the first housing section, and the controller is adapted to prevent the at least partially see-through touch sensitive member from being used as the user input when the second housing section is at a first position relative to the first housing section, wherein the first position comprises a first portion of the display being located directly behind the window, and wherein the second position comprises the first portion of the display being located spaced from being directly behind the window, where the first position is a closed position and the second position is an open position.

14. An apparatus as in claim 13 the second position comprises a second portion of the display being located at the first location directly behind the window.

15. An apparatus as in claim 13 wherein the first housing section comprises an alphanumeric keypad.

16. An apparatus as in claim 13 wherein the second housing section is longitudinally slidable relative to the first housing section between the first and second positions.

17. An apparatus as in claim 13 wherein the first position comprises the display being completely covered by the first housing section, and the first portion of the display being viewable through the window.

18. An apparatus as in claim 17 wherein the second position comprises the first portion of the display being located above a top side of the first housing section, and a second portion of the display being viewable through the window.

19. An apparatus as in claim 13 wherein the touch sensitive member comprises a touch sensitive film which is transparent.

20. An apparatus as in claim 13 wherein an acoustic chamber is provided between the touch sensitive member and the display.

21. An apparatus as in claim 13 wherein the window is located at a first side of the apparatus, and wherein the first portion of the display is located at the first side of the apparatus when the second housing section is at the second position.

22. An apparatus as in claim 13 wherein the controller is adapted to automatically display a predetermined image on a second portion of the display located directly behind the window when the second housing section is at the second position.

23. An apparatus as in claim 22 wherein the image comprises an image of function keys.

24. An apparatus as in claim 22 wherein the image is specific to an application in use on the apparatus, wherein the controller is adapted to display at least one of a plurality of different images on the second portion dependent upon the application in use on the apparatus.

25. A method comprising:
providing a first housing section comprising a window, the window comprising a touch sensitive member which is at least partially transparent;
providing a second housing section including a display;
movably connecting the second housing section to the first housing section, wherein the second housing section is movable relative to the first housing section between a first closed position and a second open position, wherein in the first position a first portion of the display is located at a first location directly behind the window, wherein in the second position the first portion of the display is located at a second location, spaced from the first location directly behind the window and beyond an outer edge of the first housing section, and a second portion of the display is located at the first location directly behind the window;
and connecting a controller to the at least partially transparent touch sensitive member and the display, wherein the controller is adapted to automatically disable the at least partially transparent touch sensitive member from being used as a user input for the device when the second housing section is at the first closed position.

26. A method as in claim 25 wherein the controller automatically displays a predetermined image on the second portion of the display when the second housing section is at the second position.

27. A method as in claim 26 wherein the controller automatically disables the touch sensitive member from being used as a user input for the device when the second housing section is at the first position.

28. A method comprising:
moving a second housing section of a hand-held electronic apparatus relative to a first housing section of the apparatus from a first closed position to a second open position, wherein in the first position a first portion of a display on the second housing section is located at a first location directly behind a window on the first housing section, and wherein in the second position the first portion is located spaced from the first location directly behind the window; and
changing functionality of the window from a protective only see-through window when the second housing section is in the first closed position to both a touch sensitive user input and a protective see-through window when the second housing section is in the second open position.

29. A program storage device readable by a machine, tangibly embodying a program of instructions executable by the machine for performing operations to control a user input in an electronic device, wherein the user input comprises a touch sensitive member which is at least partially see-through, the operations comprising:
determining whether a second housing section of the electronic device is located at a first closed position or a second open position relative to a first housing section of the device, wherein the touch sensitive member is located on the first housing section and a display is located on the second housing section, wherein different portions of the display are visible through a window on the first housing section when the first and second housing sections are at the first and second positions, respectively;
allowing input into the electronic device by a user at the touch sensitive member when the first and second housing sections are at the second position; and
preventing input into the electronic device at the touch sensitive member when the first and second housing sections are at the first closed position.

* * * * *